Figure 1:
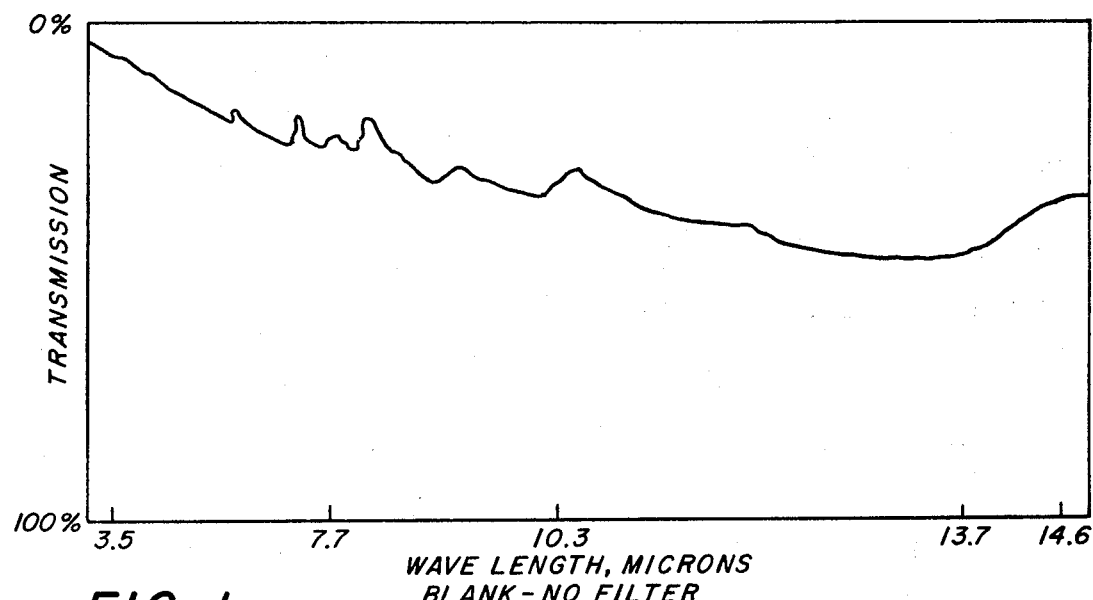

United States Patent
Strange et al.

[11] 3,736,421
[45] May 29, 1973

[54] DETERMINATION OF CRYSTALLINE SILICA AND OTHER MATERIAL DUSTS IN AIR

[75] Inventors: John P. Strange, Murrysville; Ray S. Freilino, Pittsburgh; Paul W. McConnaughey, Wilkinsburg, all of Pa.

[73] Assignee: Mine Safety Appliances Company, Pittsburgh, Pa.

[22] Filed: July 27, 1971

[21] Appl. No.: 166,494

[52] U.S. Cl.............250/43.5 R, 73/28, 250/220 SD, 356/38, 356/244
[51] Int. Cl....G01n 21/16, G01n 31/00, G01n 33/28
[58] Field of Search...............................356/38, 244; 250/43.5 R, 220 SD; 73/28

[56] References Cited

UNITED STATES PATENTS

| | | | |
|---|---|---|---|
| 3,654,801 | 4/1972 | Keefer | 73/28 |
| 2,076,553 | 4/1937 | Drinker et al. | 356/38 |
| 2,869,414 | 1/1959 | Schulz | 356/244 |

*Primary Examiner*—James W. Lawrence
*Assistant Examiner*—T. N. Grigsby
*Attorney*—Brown, Murray, Flick & Peckham

[57] ABSTRACT

According to the invention crystalline silica in the form of particles finer than 10 microns (respirable dust) in air, such as mine atmospheres, is determined by removing from the air particulate matter larger than 10 microns and then passing the air through a membrane filter to collect the residual particulate matter including respirable dust, if any. The filter with its adherent dust provides an analytical sample which is placed in one beam of a double-beam infrared spectrophotometer; an unused, clean membrane filter of the same material and size is placed in the other beam of the spectrophotometer as a reference, and the two beams are subjected to infrared radiation to produce a spectrum of the dust on the sample filter. The presence of respirable crystalline silica is shown qualitatively by the presence of twin peaks of the spectrum at 12.52, 12.82 microns.

In like manner the method of this invention may be applied to the determination of other crystalline minerals in the form of particles finer than the wave length of the infrared radiation, including other dusts hazardous to the health of workmen, including mixtures of such other crystalline minerals with one another or with silica. In most cases such other crystalline minerals will be finer than 20 microns although in some instances they may be finer than about 35 microns.

The various crystalline minerals possess, like crystalline silica, characteristic absorption peaks, which may be used to identify the minerals of a given sample, just as in the case of crystalline silica, and in general these identifying peaks have been reported in the literature of infrared mineral spectroscopy.

6 Claims, 6 Drawing Figures

INVENTORS.
JOHN P. STRANGE,
RAY S. FREILINO &
PAUL W. McCONNAUGH
By Brown, Murray, Flick & Peckham
Attorneys Patented May 29, 1973 3,736,421

3 Sheets-Sheet 2

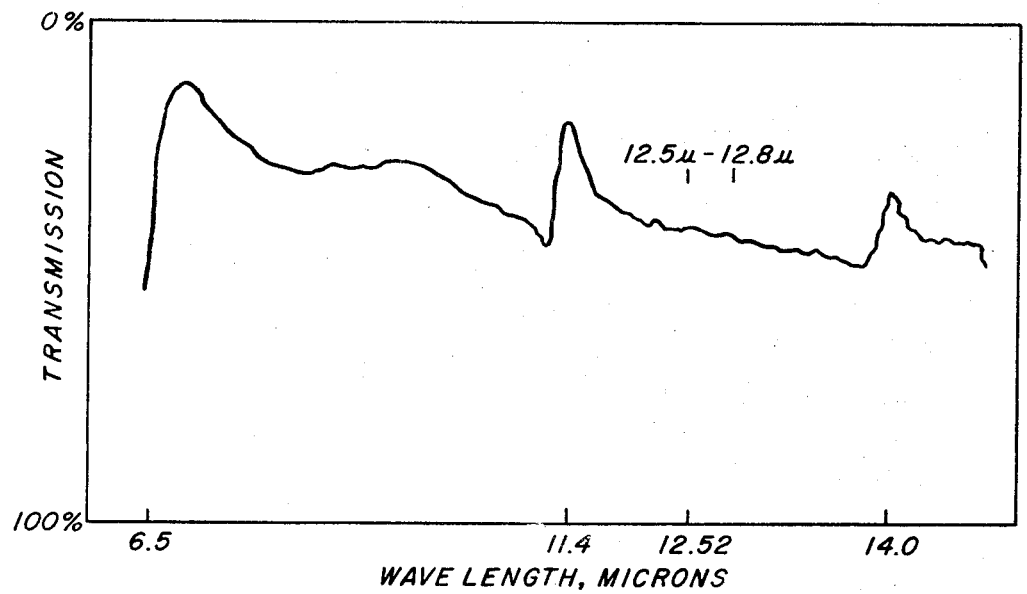
FIG. 5. WAVE LENGTH, MICRONS
CaCO₃ ONLY
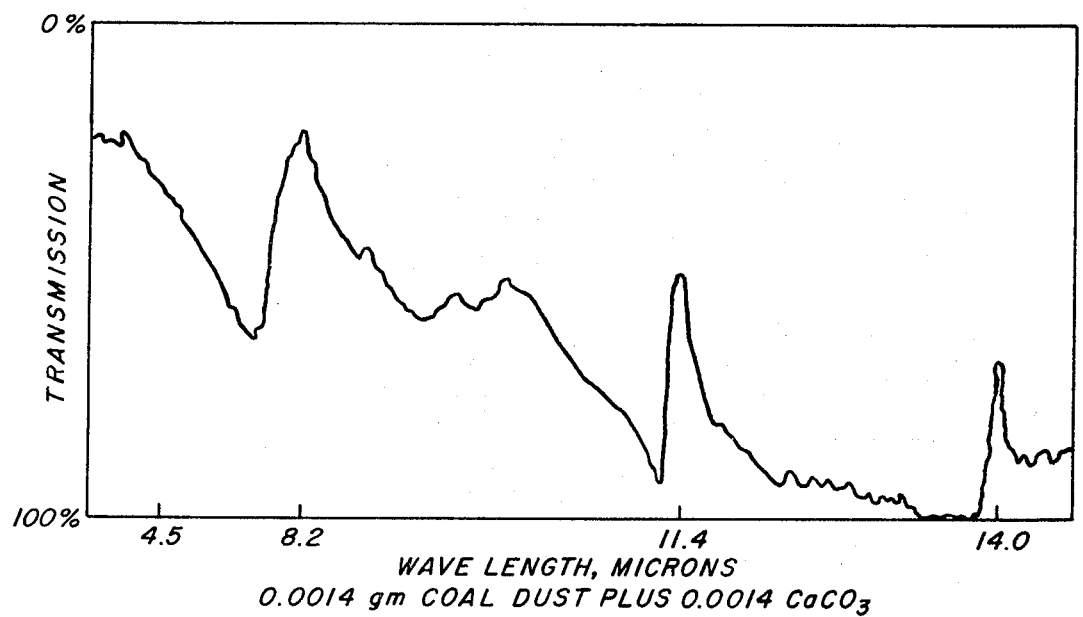
FIG. 6. WAVE LENGTH, MICRONS
0.0014 gm COAL DUST PLUS 0.0014 CaCO₃

DETERMINATION OF CRYSTALLINE SILICA AND OTHER MATERIAL DUSTS IN AIR

With the increased attention during recent years to diseases of the lung caused by dusts, in particular crystalline $SiO_2$ dust, the worst offender in the breather atmospheres of workmen, there remains a need for a fast and convenient method of determining the content of crystalline silica of respirable dust size as well as of the presence of other mineral hazardous to health to which the workmen are exposed. In particular, there is need for a rapid and accurate method of determining crystalline silica in the form of respirable dust in air; respirable dust for the purposes of the invention is defined as crystalline silica in the form of particles below 10 microns in size. The invention is particularly applicable to the determination of respirable silica dust in air, but as will appear it is applicable equally to the determination of other crystalline minerals that may have an adverse effect upon the health of workmen, which are in the form of respirable particles in air.

The presently approved method of determining crystalline silica (quartz) from a mine or other atmosphere where people work is one designated as Standard Method 19 by the United States Bureau of Mines. In accordance with that procedure the dust carried by a fixed volume of air is collected upon a membrane filter form which it is removed by ultrasonic cleaning or the filter is ashed. In either case the dust or ash is mixed with powdered potassium bromide (KBr), and the mixture is pressed, as by means of a die and hydraulic press to form a thin pellet 0.040 to 0.060 inch thick. The pellet is placed in one beam of a double beam infrared spectrophotometer. A reference pellet of pure KBr of substantially the same size is placed in the other beam of the spectrophotometer. The spectral absorption of the pellet containing the collected dust is then determined by standard infrared spectroscopy procedure. If crystalline silica is present in the dust sample the resultant spectrum will show a double absorption peak at 12.52, 12.82 microns. No such peaks will occur in the reference beam even if other minerals are present. The percentage content of quartz can be determined by a procedure described in the aforementioned Bureau of Mines Standard Method 19.

Although the method just described affords a satisfactory laboratory technique, it is subject to disadvantages. The preparation of pellets of a mixture of potassium bromide and collected dust requires careful manipulation and is time-consuming. KBr of high purity is required, and since it is deliquescent it is necessary to protect it and the pellet during and after forming from exposure to humid air.

It is among the objects of this invention to provide a method of determining crystalline silica or other respirable mineral dust in air that avoids the disadvantages of the KBr procedure, including the need for protection against high humidity, which involves fewer steps and is thus more rapid, and which makes provision for storage of samples after measurement for future reference.

A further object is to provide such a method that is applicable to respirable dusts other than silica as well as to mixtures of such respirable mineral dusts.

Yet another object is to provide a method as just described that is applicable both to identification of respirable mineral dusts but also to determination in the range of the Threshold Limit Value (TLV), i.e., the concentration of respirable silica or other mineral dust hazardous to health to which a workman may be exposed for 8 hours.

The present invention is predicated on the collection of the dusts or dust carried in a known volume of air upon a membrane filter which with its content of collected dust provides directly a sample for infrared analysis. In other words, the infrared analysis is performed upon a membrane filter which has been used to collect the dust from, for example, a mine or other atmosphere and which is then subjected to infrared analysis without further treatment.

More in detail, in the practice of the invention a fixed, or known volume of the air to be tested is treated to remove particulate matter larger in size than 10 microns and the thus-treated air is passed through a membrane filter to collect particulates of less than 10 micron size. In this way there is formed a sample for analysis. It is placed in one beam of a double beam infrared spectrophotometer. The other beam receives an unused, clean membrane filter to provide a reference beam. Infrared radiation is then passed through both filters to form a spectrum of the sample. Such spectra may be recorded in accordance with customary practice.

Although various types of gravimetric or inertial samplers are known and available on the market, we now prefer to use one described in application, Ser. No. 93,275, filed Jan. 27, 1970, by J. P. Strange, et al, now U.S. Pat. No. 3,686,835 and assigned to Mine Safety Appliances Company, of Pittsburgh, Pennsylvania, the disclosure of which is incorporated herein by reference. This sampler is approved by the U. S. Bureau of Mines and by the U. S. Department of Health, Education and Welfare for the preparation of samples of respirable dust.

The membrane filters of this invention are extremely thin, generally of the order of about 0.005 inch thick. A number of synthetic resins that are transparent to the wave lengths being used in the practice of the invention and which are not objectionably affected by moisture are available for the making of membrane filters suited to the practice of the invention. Examples of such materials are cellulose acetate, polyesters, nylon, acrylic polymers or copolymers, and vinyl polymers or copolymers. The preferred material at present is polyvinylchloride.

Several double beam infrared spectrophotometers are available on the open market and give better results than a single-beam instrument. They may vary in details of construction but all suffice for the purpose of this invention. The manner of using them is well known to those conversant with infrared spectroscopy. Illustration of such a preferred device is therefore unnecessary to an understanding of the invention.

In this way, the difficulties and disadvantages of the present approved method of determining crystalline silica and other mineral particulates hazardous to health are avoided, together with the extreme care and time consumed in removing the dust from the filter or in ashing the filter to provide material using the dust or ash to form the measuring pellet.

The invention will be described with particular reference to its use in determining the presence of respirable crystalline silica, or quartz, in air or any other gas to which workmen are exposed, although as indicated above, it will be understood that it is equally applicable to determining the presence of other particulate mineral substances.

To this end, the sample is produced as described above and disposed in one beam of the spectrophotometer, a reference filter being inserted in the other beam. Infrared radiation is now passed through the two beams. The particulate matter on the sample will produce an infrared spectrum, and if crystalline silica is present a double peak will appear at 12.52, 12.82 microns. No such peak will occur in the reference beam, which will merely exhibit attenuation of the beam as the wave length of the radiation increases. In this way it is determined qualitatively that crystalline silica is present in the sample.

If quantitative determination is desired the filter is weighed before the known volume of air has passed through the filter.

For most purposes, it is preferred to mount the sample membrane in a cassette for ease of handling and because in this way samples may be retained for future use, as in checking the results of the analysis or using it to check or compare with other similarly prepared samples.

Having reference now to the drawings, which are reproductions on a uniform smaller scale than the actual spectra identified with each drawing, FIG. 1 shows that the only result of passing the radiation through the membrane is to show that spectrum of a new, clean membrane contains substantially no peaks characteristic of any foreign material, and that the membrane itself produces substantially neutral attenuation of the beam, although attenuation is less at the longer wave lengths. In all of these figures the ordinates represent transmission, 100 percent at the bottom, 0 at the top.

Figure 2:
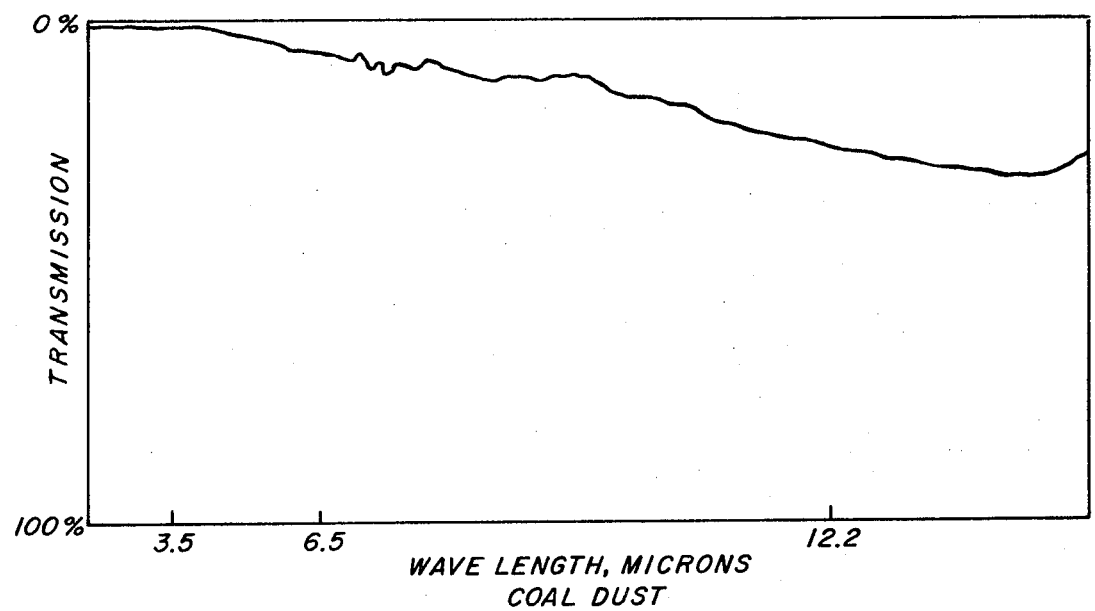

FIG. 2 shows the spectrum obtained from the same kind of membrane which had collected a few milligrams of coal dust while installed in a gravimetric sampler. This measurement was made without a membrane filter in the reference beam also. A decreasing optical density at the longer wave lengths is still evident, and there are no characteristic peaks.

Figure 3:
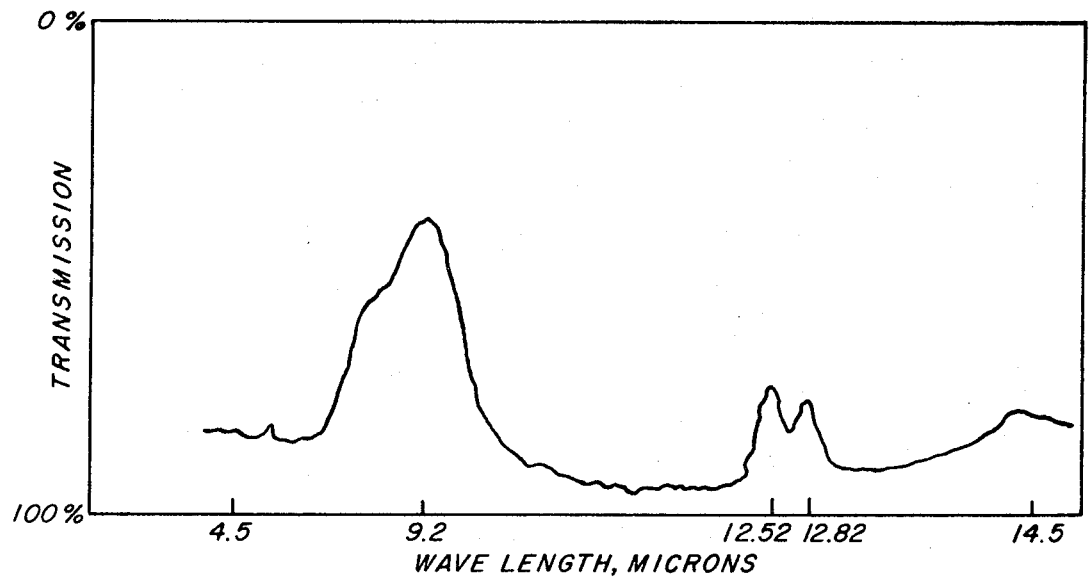

FIG. 3 is a representation of the spectrum obtained with the same kind and size of membrane filter which had collected 0.8 mg of crystalline silica of less than 10 microns size. In this case a reference membrane was used in the comparison beam of the instrument. The presence of crystalline silica in the sample is indicated clearly by the twin peaks at 12.52 and 12.82 microns. This is a well established characteristic of crystalline silica that is well known to those dealing with infrared identification of mineral species.

Figure 4:
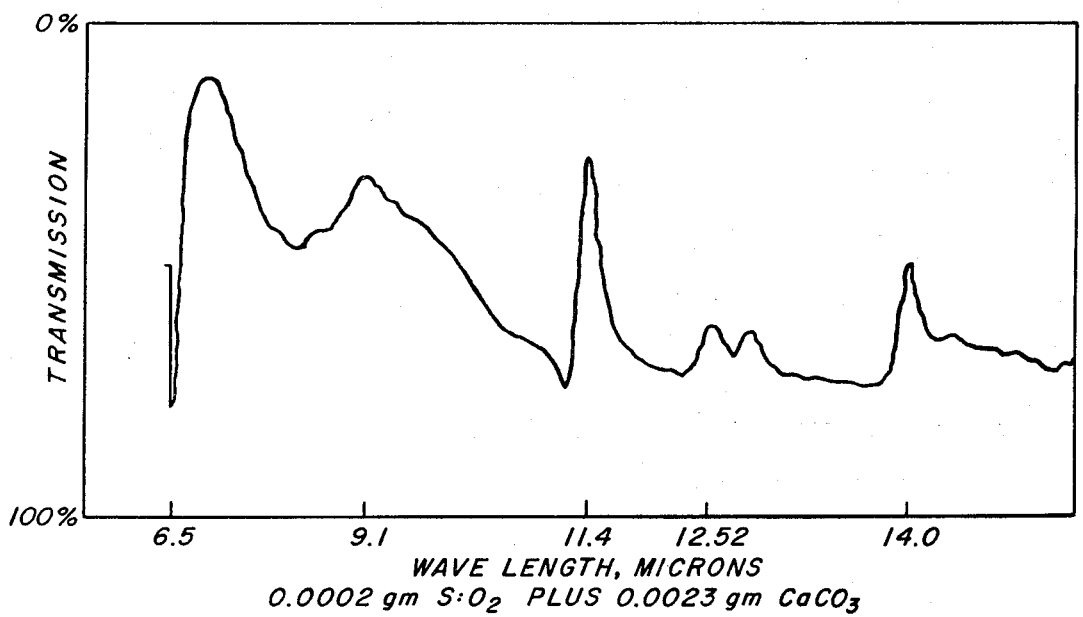

FIG. 4 shows the spectrum obtained with a membrane filter which had collected 0.2 mg of silica together with 2.3 mg of limestone dust collected separately, as determined by weighings made before and after each procedure. The silica peaks are clearly evident.

Two features are of importance in connection with the spectrum of FIG. 4. The strength of the twin peaks are such that they are about 20 times noise. With peaks of about 10 chart divisions for 200 micrograms of silica and a signal to noise ratio of 20, it is possible easily to detect TLV amounts.

If necessary the sensitivity of the determination may be enhanced by folding the filter so that the infrared beam passes through two or more layers of the deposited dust. Another way of accomplishing the same thing is to ash the filter, at, say, 700°C, and to redeposit the residue on a reduced area of a second filter. We now believe that such a procedure will not be necessary, at least in most instances, but even if it were used it would be much simpler than forming a KBr pellet.

A second important point shown by this spectrum is that the method might be used to determine whether gravimetric samples collected in coal mines to determine compliance with Public Law 91-173 contain other than coal dust. A rapid screening procedure could be set up to determine whether filters showing weight gains exceeding the prescribed limit had collected appreciable rock dust along with the coal dust. The method might even be useful in determining the silica content of rock dust used for explosion prevention.

As showing that limestone dust does not obscure or interfere with the determination of crystalline silica, reference may be made to FIG. 5, the spectrum of which was made with a membrane filter which had collected 2.3 mg of limestone dust only. Peaks characteristic of crystalline silica are just barely discernible in this spectrum, presumably because of the presence of a small amount of quartz in the limestone dust, but it will be clear that the presence of crystalline silica will be shown without question with a sample containing both silica and limestone dusts.

Coal dust is opaque to infrared and has no definite or significant I.R. spectrum. It is more opaque to short wave lengths than long ones, which is advantageous in the determination of crystalline silica by the invention because the identifying silica peaks occur in the longer wave length region of the spectrum.

Another aspect of the invention is represented by FIG. 6. This spectrum resulted from 1.4 mg of coal dust and 1.4 mg of limestone dust (rock dust) collected on a membrane filter. This shows the attenuation of the beam at the shorter wave lengths due to the coal dust, the decreasing opacity of coal dust at longer wave lengths, and the stronger characteristic peaks due to the limestone which occur where the coal dust is relatively transparent.

The absorption peak used for identifying limestone occurs at a wave length of 11.4 microns.

As indicated above, the invention is applicable also to the determination of dusts of minerals other than those of crystalline silica type, and to mixtures of such minerals. The procedure used in such instances is the same as that described in detail above. In these instances also, it will generally be necessary that the dust being treated be of less than 10 microns size although for some minerals the particles may be as great as, for example, about 35 microns.

The infrared beam passed through a sample is generally attenuated in passing from the shorter to the longer wave length of the spectrum. This is not significant in many cases or for some purposes but when large amounts of a collected dust are on the membrane, or where the dust is opaque, the resulting attenuation may interfere with, or even prevent obtaining, a satisfactory analytical spectrum. In the event that the dust on the membrane obscures the analysis by such attenuation, the sample filter can be ashed and the resulting residue redispersed on an unused, clean filter of the same material and size, and this second filter is then used for analysis. In that way the sensitivity of the determination is enhanced.

Another way of enhancing sensitivity where the filter does not contain enough collected dust to produce a sharp or adequate spectrum is to fold the filter so that the infrared beam passes through two or more layers of the deposited dust.

The procedure of ashing the depositing the residue on a second filter as just described is obviously much simpler than the Bureau of Mines approved method of determining crystalline silica in accordance with which the collected dust is removed from the filter by an ultrasonic cleaning, or the filter and its load of dust is ashed, with conversion in either case of the collected material to a KBr pellet with its attended disadvantages.

It is to be observed that the infrared spectrum of amorphous or non-crystalline materials, such as silica gel, does not contain peaks such as characterize crystalline materials.

We claim:

1. The method of determining crystalline mineral particles suspended in a gas, comprising passing the gas through a membrane filter transparent to radiation in the infrared spectrum to collect any such particles on the filter, and placing the filter with its collected particles in an analytical beam of an infrared spectrophotometer to produce a spectrum of the particles on the filter.

2. The method recited in claim 1, in which said spectrophotometer has a double beam, the method including placing said filter with its collected particles in one of said beams, and placing an unused and clean similar membrane filter in the other beam as a reference.

3. The method recited in claim 1, in which said gas is air, the method including first removing from said air particles that are coarser than particles of respirable size, thereby leaving particles of respirable size for collection on said filter.

4. The method recited in claim 3, in which said coarser particles are larger than 10 microns.

5. The method recited in claim 3, in which said collected particles include crystalline silica.

6. The method recited in claim 1, in which said gas is air and said spectrophotometer has a double beam, the method including first removing from said air particles that are coarser than particles of respirable size, thereby leaving particles of respirable size for collection on said filter, placing said filter with its collected particles in one of said beams, and placing an unused and clean similar membrane filter in the other beam as a reference.

* * * * *